United States Patent [19]

Cash et al.

[11] 3,763,467

[45] Oct. 2, 1973

[54] METHOD AND APPARATUS FOR READING DOCUMENTS

[75] Inventors: Kenneth W. Cash; Richard L. Dorr; Georg N. Gaebelein, all of Rochester, Minn.

[73] Assignee: International Business Machines Corporation, Armonk, N.Y.

[22] Filed: May 4, 1972

[21] Appl. No.: 250,266

[52] U.S. Cl.340/146.3 WD, 235/61.11 R, 235/61.12 R, 235/61.6 R

[51] Int. Cl. .......... G06r 19/06

[58] Field of Search ........ 340/146.3 FT, 146.3 WD, 340/146.3 Z, 146.3 AH, 146.3 A, 324 A; 178/77, 79, 80, 2, 3; 235/61.11 R, 61.11 E, 61.11 D, 61.7 R, 61.7 A, 61.7 B, 61.12 R, 61.6 E

[56] References Cited

UNITED STATES PATENTS

| | | | |
|---|---|---|---|
| 3,609,880 | 10/1971 | Arbon | 235/61.6 E |
| 3,391,272 | 7/1968 | Drew | 235/61.11 D |
| 3,619,573 | 11/1971 | Philip et al. | 235/61.12 R |

*Primary Examiner*—Thomas A. Robinson
*Attorney*—Donald F. Voss et al.

[57] ABSTRACT

Method and apparatus for reading coded data on information bearing media where the data fields are defined by sensible indicia which also defines the data type and format indicia indicates which M of N data indicia is to be selected after sensing N data indicia.

14 Claims, 12 Drawing Figures

Patented Oct. 2, 1973 3,763,467
8 Sheets-Sheet 2
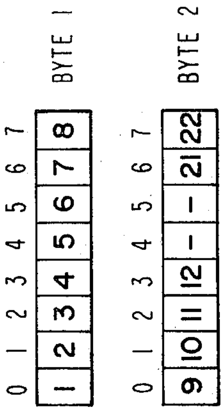
FIG. 7
| P | 0 1 2 | 3 4 5 6 7 | 8 9 10 11 12 13 14 15 | P |
|---|---|---|---|---|
| P1 | OP CODE | FIELD 1 | FIELD 2 | P2 |
| | STO=0 | LSR ADDR | CONSTANT | |
| | BU=3 | HI ROS ADDR | LOW ROS ADDR | |
| | BOC=1 | TST COND | ADDRESS | |
| | XFR=2 | LSR ADDR | LOCATION | |
| | AND=C | LSR ADDR | CONSTANT | |
| | ANDM=D | LSR ADDR | CONSTANT | |
| | ORI=8 | LSR ADDR | CONSTANT | |
| | ORM=9 | LSR ADDR | CONSTANT | |
| | XO=E | LSR ADDR | CONSTANT | |
| | XOM=F | LSR ADDR | CONSTANT | |
| | ADD=A | LSR ADDR | CONSTANT | |
| | ADDM=B | LSR ADDR | CONSTANT | |
| | UNUSED=7 | | | |
FIG. 8
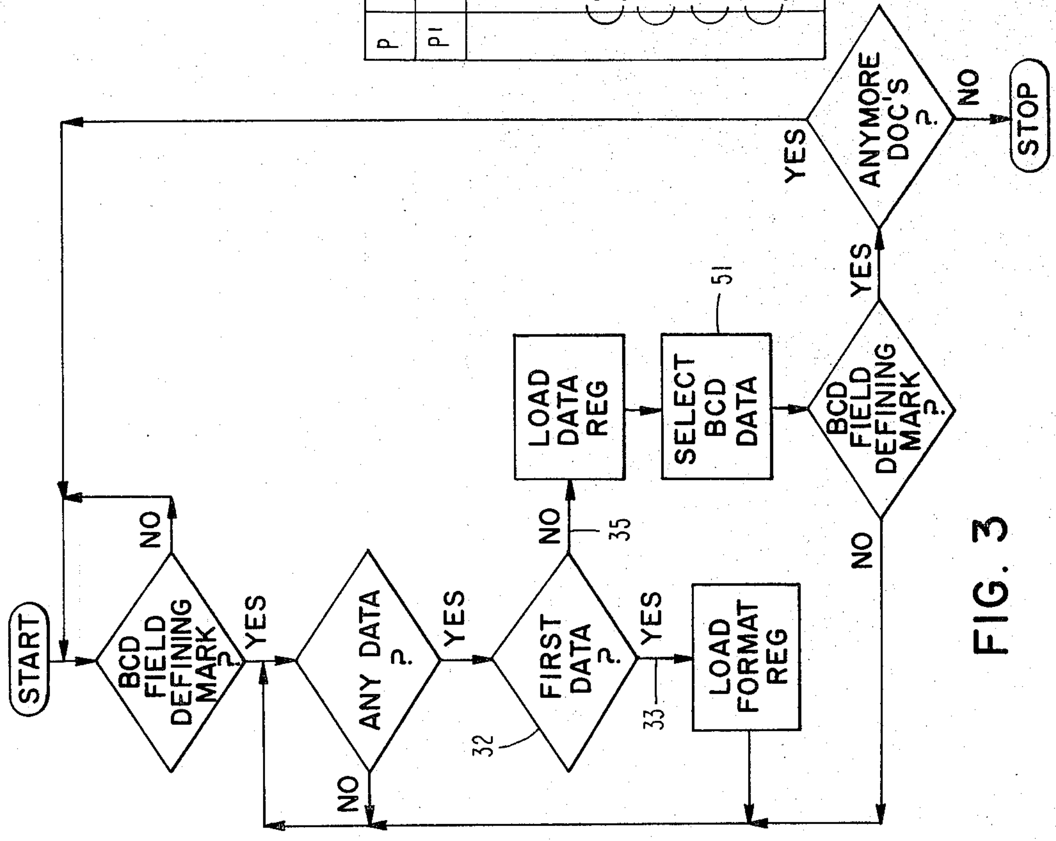
FIG. 3

Patented Oct. 2, 1973 3,763,467

8 Sheets-Sheet 4

BRANCH ON CONDITION

| | | | |
|---|---|---|---|
| ALUO | EQU | X'00' | ALU OUTPUT IS EQUAL TO 0 |
| NC | EQU | X'01' | NOT ALU CARRY OUT |
| DBUS | EQU | X'03' | D BUS PARITY ERROR |
| DREG0 | EQU | X'10' | D REGISTER BIT 0 |
| DREG1 | EQU | X'11' | D REGISTER BIT 1 |
| DREG2 | EQU | X'12' | D REGISTER BIT 2 |
| DREG3 | EQU | X'13' | D REGISTER BIT 3 |
| DREG4 | EQU | X'14' | D REGISTER BIT 4 |
| DREG5 | EQU | X'15' | D REGISTER BIT 5 |
| DREG6 | EQU | X'16' | D REGISTER BIT 6 |
| DREG7 | EQU | X'17' | D REGISTER BIT 7 |

FIG. 9

TRANSFER ADDRESSES

| | | | |
|---|---|---|---|
| LSRS | EQU | X'05' | SELECT THE HIGH OR LOW LSR'S |
| AR | EQU | X'21' | A REGISTER |
| SDC1 | EQU | X'48' | FIRST SKEW DETECTION AND CONTROL |
| IC | EQU | X'22' | INSTRUCTION COUNTER |
| BUSIN | EQU | X'90' | BUS INTO LSR |
| DREG | EQU | X'81' | TRANSFER THE 'D' REGISTER TO AN LSR |
| SHIFTRT | EQU | X'84' | SHIFT RIGHT ONE POSITION |
| MEMIN | EQU | 'C0' | R/W DATA TO LSR |
| MEMDAT | EQU | '0C' | LSR TO R/W BUFFER |
| MEMSEL | EQU | '30' | R/W BUFFER SELECT CONTROL |

FIG. 10

METHOD AND APPARATUS FOR READING DOCUMENTS

BACKGROUND OF THE INVENTION

1. Field of the Invention

This invention relates to method and apparatus for reading documents bearing coded data in the form of sensible indicia and more particularly to such method and apparatus where the documents read bear sensible field defining indicia, format indicia for indicating which M of N data indicia are to be selected, and rows of N data indicia.

2. Description of the Prior Art

Prior art methods and apparatus for reading coded data on information bearing media were not very flexible and in some instances required computers to interpret the data read. Inflexibility resided in fixed format fields and inability to intermix differently formatted documents in one run through the machine. U.S. Pat. No. 3,033,449 shows a machine for reading coded data where the format of the data for any one code is fixed. Hence, although characters in different fields can be represented according to different codes, i.e., M out of N codes, the location of the M data for any one code is fixed and documents having the M data in different positions cannot be run in one pass. This same shortcoming is also found in U.S. Pat. No. 3,558,859.

The apparatus described in U.S. Pat. No. 3,618,018 requires the use of a computer to specify document formats and to interpret the data derived in response to reading the document. Hence, the apparatus is limited to being on-line with a computer system and relatively complex and expensive programming is required. The present invention can operate off line or on line with a computer system and if on line, no programming is required for format instructions.

SUMMARY OF THE INVENTION

The principal objects of this invention are to provide improved method and apparatus for reading coded data on information bearing media which: (a) have the capability to read documents having different data formats for the same data code; (b) do not require format programming; (c) read N data postions and select M of the N data positions according to format data; (d) permit documents to contain other data such as human readable information in the non-selected M data positions; (e) permit the recording of the coded data by the same recorder and at the same time in positions in alignment with other data to reduce document preparation printing time; and, (f) can operate off line or on line with a computer system.

The foregoing objectives are achieved by sensing for a combination of field defining marks on the document which upon being decoded define the data type. The operation then switches into a mode to sense the format indicia. Format indicia is distinguishable from data indicia on the basis that it is always the first indicia sensed after decoding the field defining marks. Thereafter, any indicia sensed is regarded as data indicia and sensing of data indicia continues until a combination of field defining marks indicates the end of the data field. The signals generated in response to sensing the format indicia are stored and then used to select which data indicia should be interpreted. Non-selected data indicia is ignored.

DESCRIPTION OF THE DRAWINGS

FIG. 3 is a general flow diagram illustrating the sequence of steps in the invention; FIG. 7 illustrates bytes 1 and 2 which are used in the preferred embodiment of the invention; FIG. 8 is a table of the instructions for the microprogrammed processor; FIG. 9 is a table of Branch-On Condition (BOC) test conditions used in the microprogrammed processor; and FIG. 10 is a table of Transfer instructions used in the microprogrammed processor.

DESCRIPTION

Figure 1:
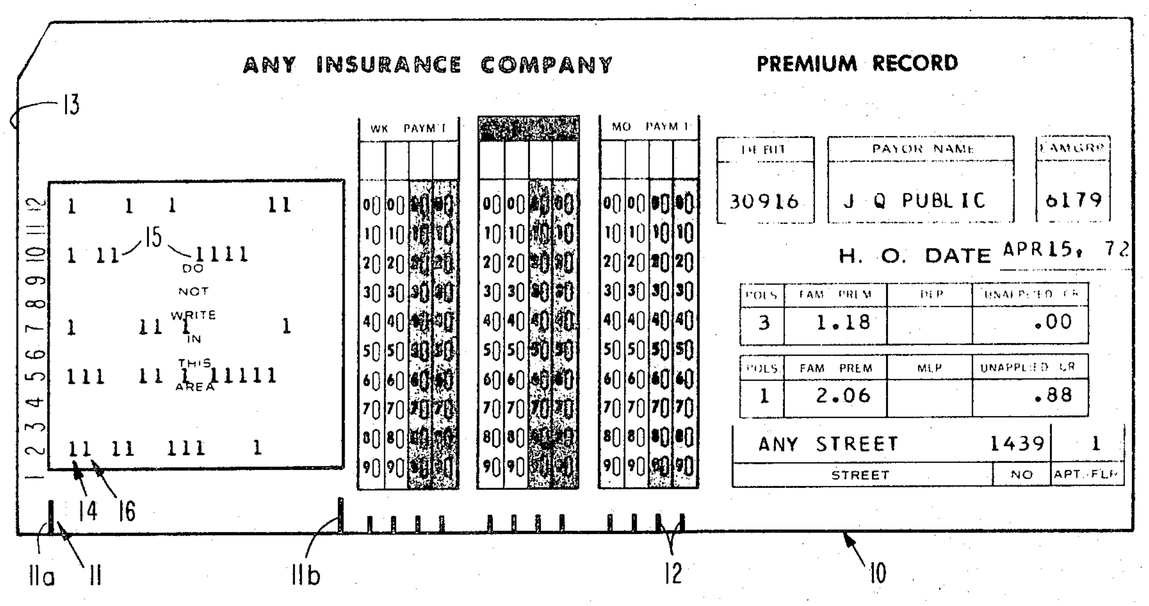
FIG. 1 illustrates a typical document containing sensible indicia defining data type, data format, and data.
Figure 2:
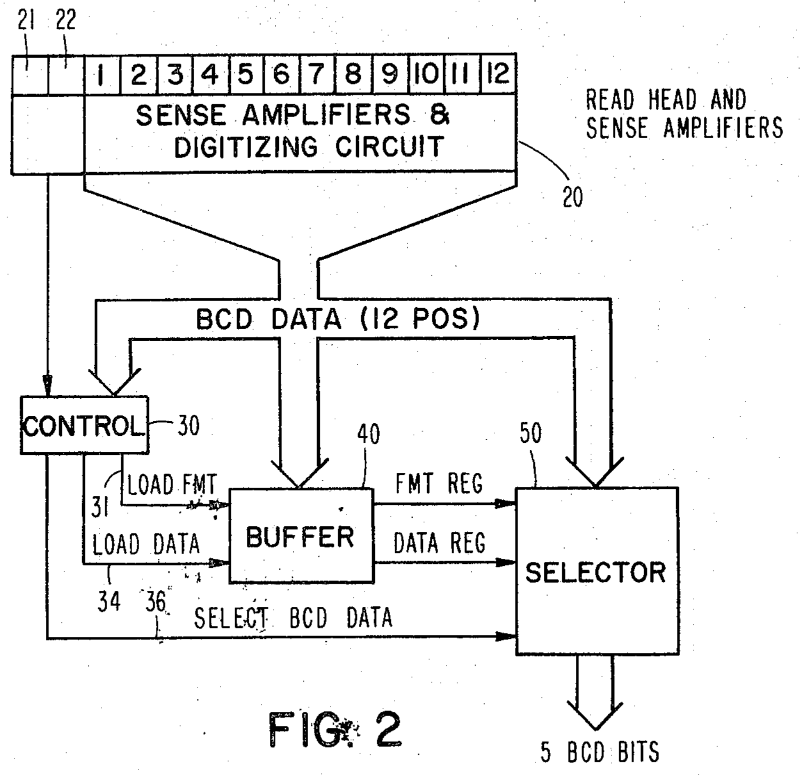
FIG. 2 is a block diagram illustrating the invention by showing data flow and control lines.

With reference to the drawings and particularly to FIG. 1, field defining marks 11 on document 10 are distinguishable from timing marks 12 in that the read head 20 of FIG. 2 includes channel 21 for sensing timing marks 12 and channels 21 and 22 for sensing field defining marks 11. The field defining marks 11 and timing marks can thus be used to identify data types. In this instance, the field defining marks 11 indicate that a binary coded decimal data (BCD) field is going to be read. The shorter length timing marks 12 indicate that a mark read field is being read. Other arrangements such as the absence of a mark near the edge with a mark adjacent to the blank edge position could define a third data type which could include human readable OCR (Optical Character Recognition) characters.

Read head 20 is illustrated schematically and is preferably a reflective type optical mark read head. Such mark read heads are well-known in the art and they preferably include a fiber optic bundle for each channel of the read head. In this instance, there would be two bundles for the field mark channels and twelve for data channels. The fiber optic bundles transmit light from a source to the document. Light reflected from the document varies with the presence or absence of a mark. The background printing on the document is printed with a non-reflective ink. The light reflected from the document impinges upon photo transistors which correspond in number to the number of fiber optic transmission bundles or channels. The photo transistors generate a signal at one level when a mark is being sensed and a signal at another level in the absence of a mark. The signals are suitably amplified and digitized by amplifiers and digitizing networks well-known in the art.

In FIG. 1 the BCD field to be read according to this invention is contained between field defining marks 11*a* and 11*b*. Marks 15 in this particular instance are actually printed but could also be handmade. In either instance, the marks 15 must be aligned in a column and they can be in any row position 1–12 depending upon the M of N code which is being used. It should be noted that the term row and column are interchangeable without affecting the scope of the invention. Document 10 moves relative to read head 20 whereby edge 13 passes under the read head first. Thus, two of the channels of read head 20, i.e., channels 21 and 22 sense columns containing field defining marks 11 and timing mark 12. The remaining 12 channels of read head 20 sense columns 1–12 containing marks 15. In this example, N equals 12. The particular code used to represent data by marks 15 is the well-known binary coded decimal or BCD code. Five columns are used for the BCD code so as to include one column for a parity bit. Thus, M equals five. It should be noted that to accommodate the particular format chosen for the document to be read and to enable printing of account number, customer name, at the same time and by the same device, that marks 15 are printed, the marks 15 for the BCD code are printed in columns two, five, seven, ten and twelve. The first row 14 of marks 15 passing read head 20 is a format row of marks. These format marks identify which five of the twelve column positions should be selected. Any mark 15 appearing in any other column will not be considered.

With reference to FIGS. 2 and 3, the method and apparatus of the invention is broadly illustrated as including apparatus and steps for identifying the field defining mark 11. Signals developed in response to sensing a field defining mark 11 are applied to control 30. Control 30 essentially develops a signal for indicating that the next row of marks 15 to be sensed is the format row 14. In FIG. 2 this signal is identified as the Load Format signal on line 31 and in FIG. 3 is identified by line 33 coming out of decision block 32. The data read by channels one-twelve of read head 20 are loaded under the control of the Load Format signal into a format register in buffer 40. Thereafter, as the document continues to move, any data sensed by read head 20 will be loaded in a data register in buffer 40 under control of a Load Data signal on line 34 of FIG. 2. The corresponding step in FIG. 3 is represented by line 35 coming out of decision block 32. The data in buffer 40 is selected by selector 50 in FIG. 2 according to the format data in the format register and under control of a Select BCD data signal from control 30 on line 36. Select BCD Data block 51 in FIG. 3 corresponds to selector 50 of FIG. 2. The operation just described repeats for each row of marks 15 until the closing field defining mark **11*b* is sensed by read head 20. The data associated with timing marks 12 will then be read as the document continues to move but the signals generated by read head 20 will not be selected as BCD data. As indicated in FIG. 3**, the next document will be read in a similar manner and if no more documents are to read, the operations stops.

Figure 4A:
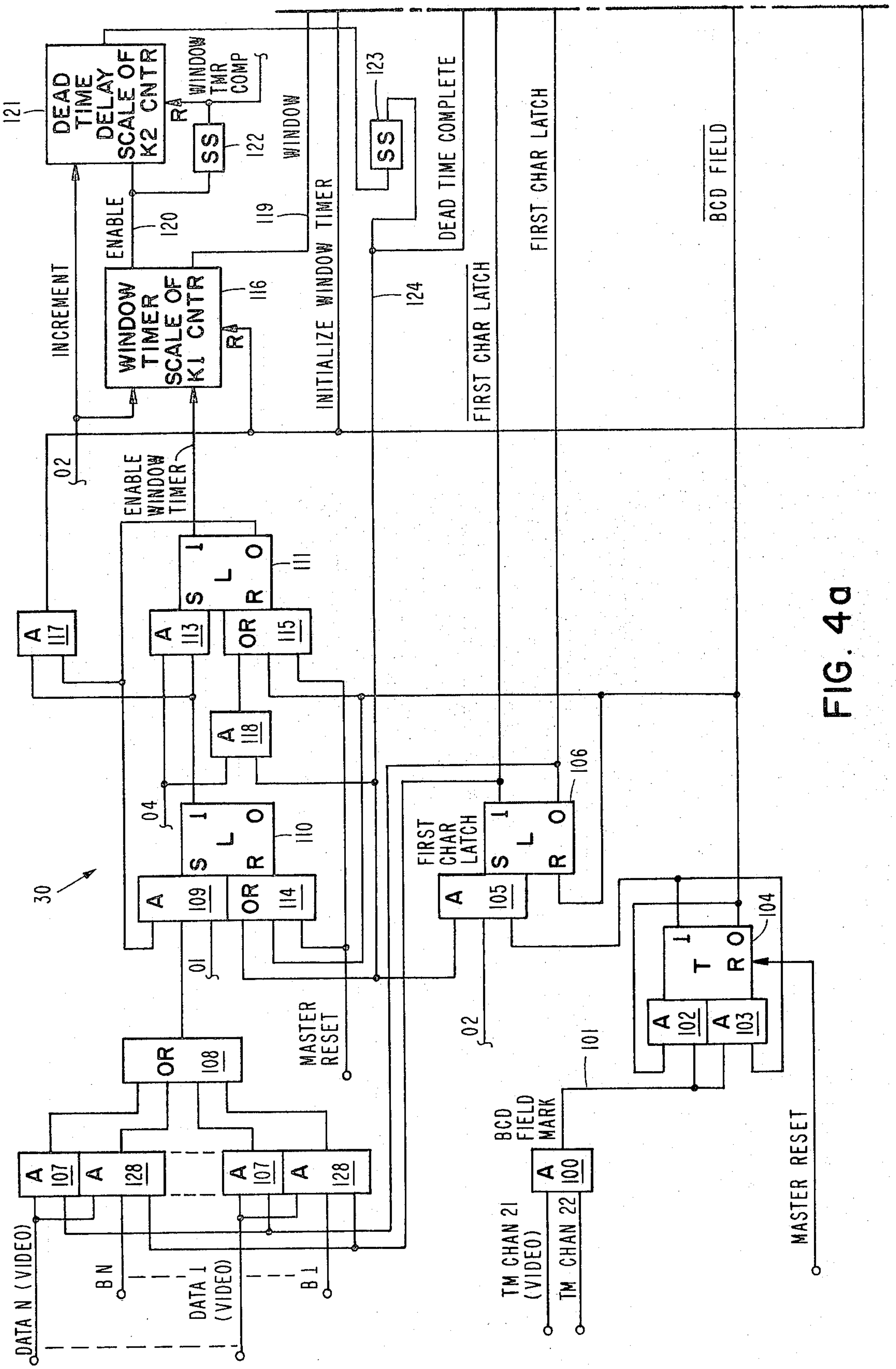
FIGS. 4*a* and 4*b* with FIG. 4*a* disposed to the left of FIG. 4*b* taken together constitute a schematic diagram of an embodiment for the invention.

The invention as generally illustrated in FIGS. 2 and 3 can be embodied in several forms without affecing the scope of the invention. Two embodiments of the invention are illustrated herein as being representative of various embodiments for the invention. One embodiment consists of hard wired logic circuitry and the other embodiment is a preferred embodiment which includes a microprogrammed processor. The hard wired logic circuitry embodiment, by way of example, is shown in FIGS. **4*a* and 4*b*. In FIG. 4*a*, control 30 is shown as including AND circuit 100 which passes a signal in reponse to sensing a field defining mark 11. This field mark identification signal is applied by conductor 101 to AND circuits 102 and 103 which control the switching of trigger 104**.

When trigger 104 is set, this is an indication that a BCD field is being read. The set output of trigger 104 is connected to AND circuit 105 for controlling the setting of first character latch 106. Of course, the first character latch 106 will not be set until the other inputs to AND circuit 105 have been satisfied. These other inputs are a timing signal called "Dead Time Complete" and a clock 02 time signal. As it will be seen shortly, latch 106 is set after the first character, i.e., the format character has been read.

After the field defining mark 11a has been sensed and identified, one or more of the AND circuits 107 which are conditioned by the reset output of latch 106, will pass a signal to OR circuit 108 if there is one or more data signals from channels 1–12 of read head 20. Any mark 15 sensed within a row of marks will cause OR circuit 108 to have an output. The output signal from OR circuit 108 is applied to set latch 110 via AND circuit 109. AND circuit 109 is conditioned by the reset output of latch 111 and by phase 01 signal from clock 112 in FIG. **4*b*. Latch 111 is set via AND circuit 113 which passes a signal at clock 04 time if latch 110 is set. A master reset signal initially resets trigger 104 directly and resets latches 110 and 111 via OR circuits 114 and 115** respectively.

The set output of latch 111 is used for enabling the development of a window for reading a row of marks 15. The window enables the reading of the marks even if they or the document are skewed, provided the skew is within certain limits. In this manner, the data marks to be read are self-clocking. The Enable Window Timer signal from the set output of latch 111 is applied to window timer counter 116. Counter 116 is initialized by a Initialize Window Timer signal passed from AND circuit 117. AND circuit 117 resets or initializes counter 116 when latch 110 is set and latch 111 is in the reset condition.

Counter 116 is incremented by clock 02 pulses. Hence, counter 116 will be advanced as long as latch 111 is set. Latch 111 will be reset by a signal passed by AND circuit 118 and OR circuit 115. Counter 116 will have an output signal called Window on conductor 119 from the time that counter 116 is enabled until counter 116 reaches a predetermined count, for example, a count equivalent to 50 mils on the document. Signals generated in response to sensing marks 15 during the window time are considered to be marks from a single row.

After a row of marks have been scanned, it is desirable to introduce a dead time before looking for data from the next row of marks. the dead time provides a clean separation between rows of marks. This is particularly useful if there is any shadow printing on the marks 15. The dead time is developed by counter 121 which is enabled by signals from counter 116 on line 120 indicating that the window time has been completed. For example, a dead time equivalent to 20 mils on the document is typical. The Window Time Complete signal is developed by single shot multivibrator 122. The output signal from single shot multivibrator 122 is used to initialize counter 121. When the count in counter 121 reaches a predetermined value, an output signal is applied to single shot multivibrator 123 which develops a Dead Time complete signal on conductor 124. This signal is applied to AND circuit 105 for setting latch 106.

Summarizing at this time, it is seen that upon sensing the field defining mark 11a, trigger 104 is set. Latch 106, however, is in its reset state and the First Character Latch signal is available for conditioning AND circuits 107. The first mark sensed in the row of marks 14 starts or opens the window to look for marks in row 14. The window is equal to approximately 60 mils on the document. After the window closes, a Dead Time delay is produced by counter 121. After the Dead Time delay, the first character latch 106 is set and this indicates that the first character should have been sensed. Thus, the set output of latch 106 in this particular instance, indicates $\overline{\text{First Character Latch}}$. Obviously, the terminology could have been reversed without affecting the scope of the invention. Likewise, counters 116 and 121 could be replaced by delay circuits without affecting the scope of the invention.

The first character scanned, i.e., the format character, is entered into buffer register 125, FIG. *4b* via AND circuits 126 which are conditioned by a signal from AND circuit 127. AND circuit 127 has an output for the period of time while a Window signal from counter 116 and a First Character Latch signal from latch 106 are simultaneously present. Buffer 125 was initially reset by the $\overline{\text{BCD}}$ Field signal from trigger 104.

With the format character in buffer 125, the reading of document 10 continues and the next row of marks to be read is the first data row 16 of marks 15, FIG. 1. The output signals from channels 1–12 of read had 20 are applied to AND circuits 128, FIG. *4a*, as well as to AND circuits 107. Because latch 106 has been set, AND circuits 107 are not conditioned at this time but AND circuits 128 are conditioned. Any mark in row 16 will start the window time in the same manner as previously described. It might be noted that latch 110 was reset via OR circuit 114 by the Deat Time complete signal on conductor 124. Similarly, latch 111 was reset via AND circuit 118 and OR circuit 118 at clock 04 time when the Dead Time complete signal was present on conductor 124.

Figure 4B:
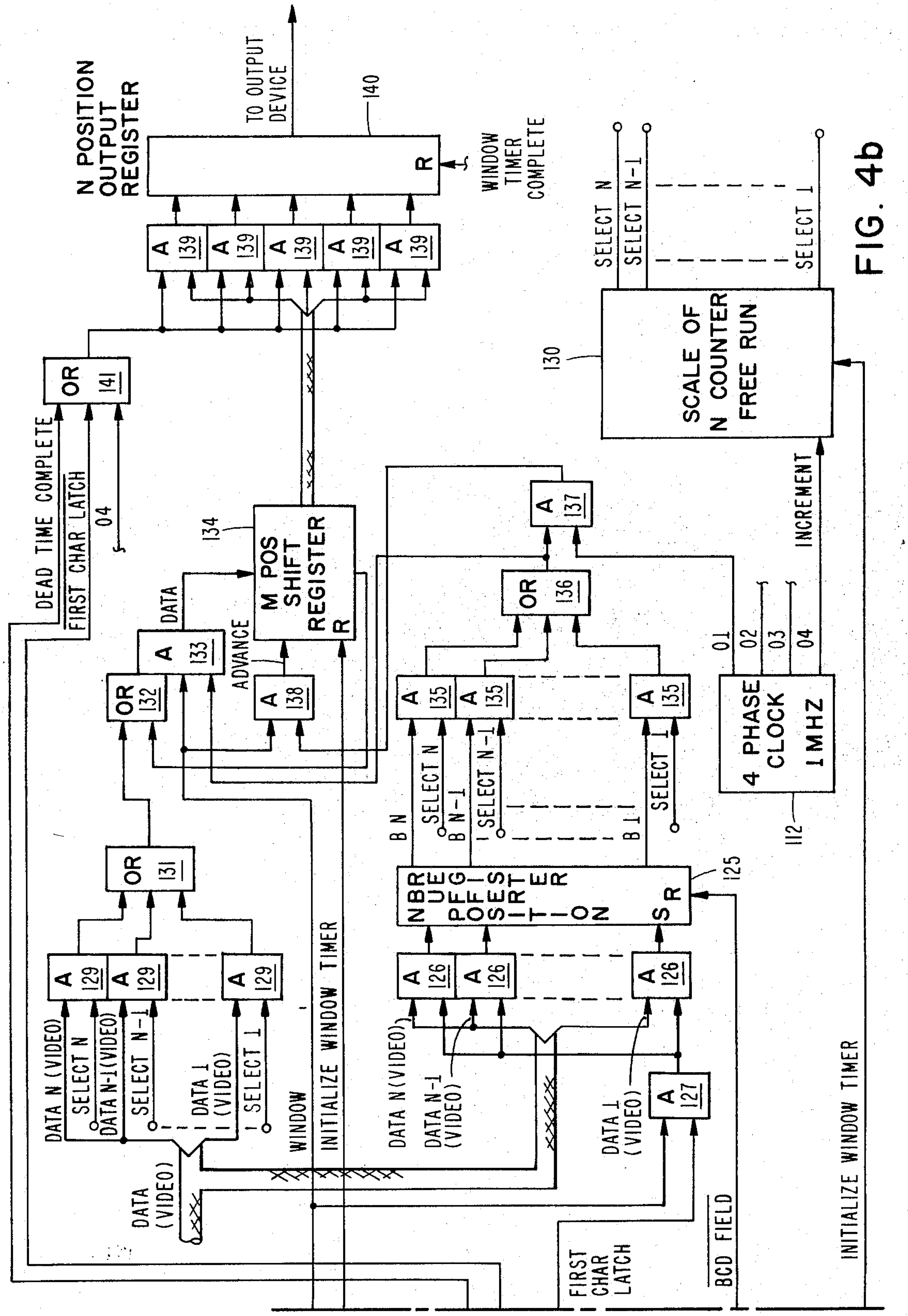

The data signals generated in response to scanning row 16 are also applied to AND circuits 129 of FIG. 4b. AND circuits 129 are conditioned sequentially by signals from counter 130. Counter 130 is incremented by 04 clock pulses from clock 112. Counter 130 is initialized by the Initialize Window Timer signal from AND circuit 117 of FIG. 4a. Thus, each AND circuit 129 will have an output signal if, upon being conditioned by an associated select signal from counter 130, there is simultaneously a data signal from read head 20.

The outputs of AND circuits 129 are connected as inputs to OR circuit 131 which passes signals to OR circuit 132. The signals from OR circuit 132 are applied to AND circuit 133 which is conditioned by the Window signal from counter 116. The signals from AND circuit 133 represent data and are entered into shift register 134. Shift register 134 has a number of positions equal to M which in this particular instance, is five. Shift register 134 is reset by the Initialize Window Timer signal from AND circuit 117. The data entered into shift register 134 via AND circuit 133 is shifted under control of the format character in buffer register 125.

The output of buffer 125 are connected to inputs of AND circuits 135. These AND circuits 135 are conditioned in the same manner that AND circuits 129 are, i.e., with signals from counter 130. The outputs of AND circuits 135 are applied to OR circuit 136 which has its output connected to AND circuit 137. AND circuit 137 is conditioned by clock 01 signals from clock 112. The signals passed by AND circuit 137 are used to advance shift register 134 during the time that the Window signal is available. This is accomplished by applying the output signal from AND circuit 137 to AND circuit 138 which is conditioned by the Window signal from counter 116. Thus, shift register 134 will be shifted M times even though there could be N data signals.

Another way to view this operation is that AND circuits 129 together with the select outputs from counter 130 serialize the data read by read head 20. Similarly, the format data in buffer register 125 is serialized by AND circuits 135 and the select outputs from counter 130. The serialized data from AND circuits 129 is entered into the shift register 134 only if the associated format data is present. This is accomplished by using the format data from AND circuits 135 to shift register 134.

A BCD character now resides in shift register 134. The significance of the bits forming the BCD character are predefined. In this particular example, the bit nearest the edge of the document adjacent to the field defining marks has a binary bit significance of one. The other bits then have the binary values of two, four, and eight with the remaining bit being a parity bit.

The BCD character in shift register 134 is transferred via AND circuits 139 to output register 140 under control of a signal from AND circuit 141. AND circuit 141 passes a signal upon simultaneously receiving a $\overline{\text{Dead Time complete}}$ signal, a clock 04 signal, and $\overline{\text{First Character Latch}}$ signal. Register 140 is reset by the Window Timer Complete signal from single shot multivibrator 122.

Succeeding rows of data are scanned in a similar manner until field defining mark *11b* is detected. When field mark *11b* is detected, AND circuit 100 passes a signal which toggles trigger 104 into the reset state. This action again conditions AND circuits 107 to enable the scanning of another BCD field. The next BCD field could be on this document which is not the case in this particular instance or a BCD field on the next document. If there were another BCD field on the same document, it should be noted that it could have a different format character.

Figure 6:
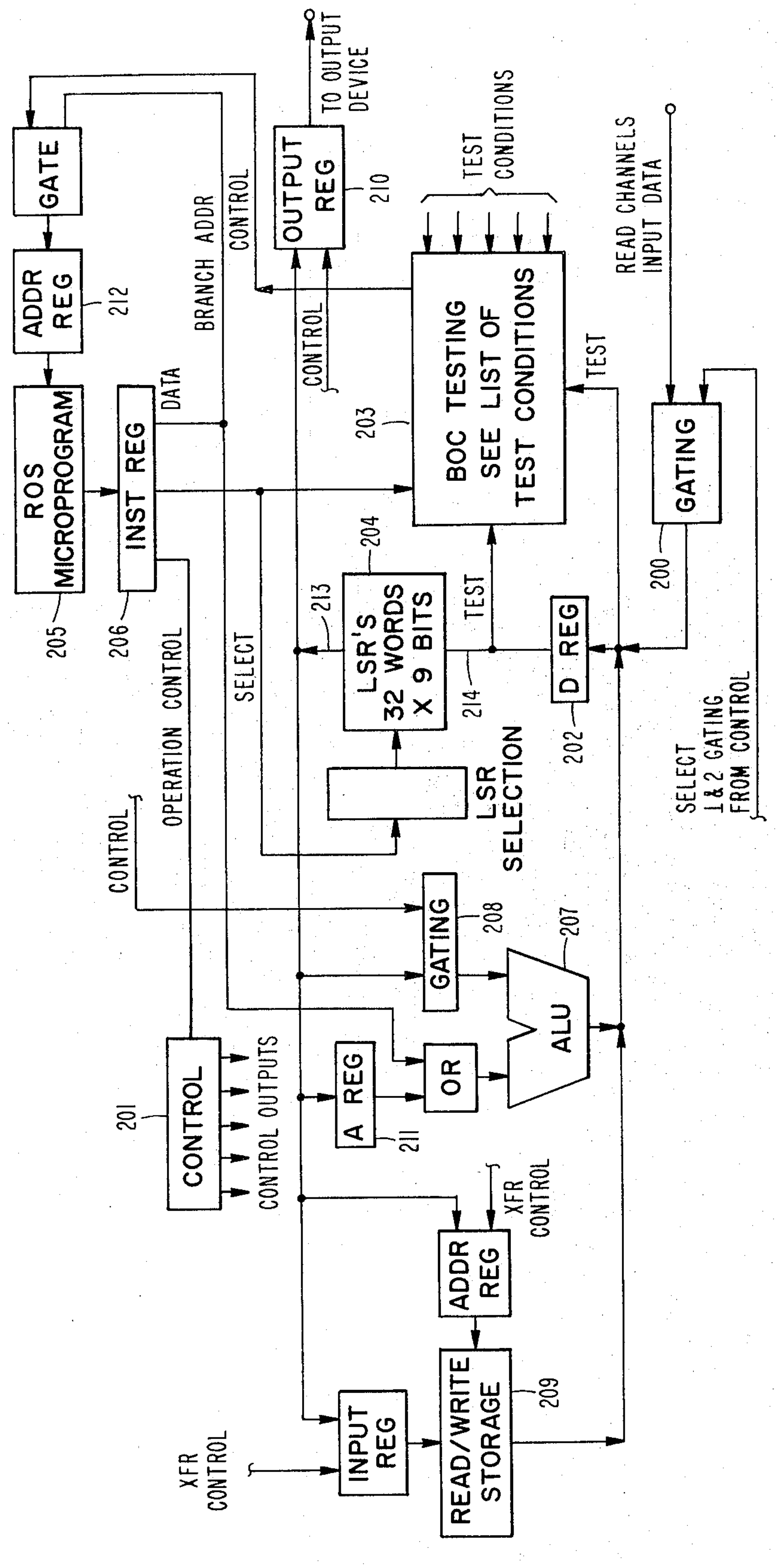
FIG. 6 is a schematic logic diagram of a microprogrammed processor used for the preferred embodiment of the invention.

Other hard wired embodiments could be used to implement the invention, however, for greater flexibility the invention can also be implemented by using a microprogrammed processor of the type shown in FIG. 6. The microprogrammed processor uses microprogram routines for performing the same functions as previously described in connection with the hard wired embodiment shown in FIGS. *4a* and *5b*.

The flow diagrams in FIGS. *5a* and *5b* illustrate the steps of the microprogrammed processor. However, these diagrams do not include "housekeeping" steps which are performed when practising the invention. The microprogram processor works with groups of bits forming a byte with eight bits in a byte. This terminology is well-known in the art and will not be further explained, however, bytes 1 and 2 are shown in FIG. 7. Byte 1 contains data bits, i.e., 0–7 from channels one-eight of read head 20. Byte 2 contains data bits from channels 9–12 in bit position 0–3 respectively. Bit positions 4 and 5 are not used and bit positions 6 and 7 contain bits from channels 21 and 22 respectively. It will be recalled that channels 21 and 22 are used for sensing the field defining marks 11.

Figure 5A:
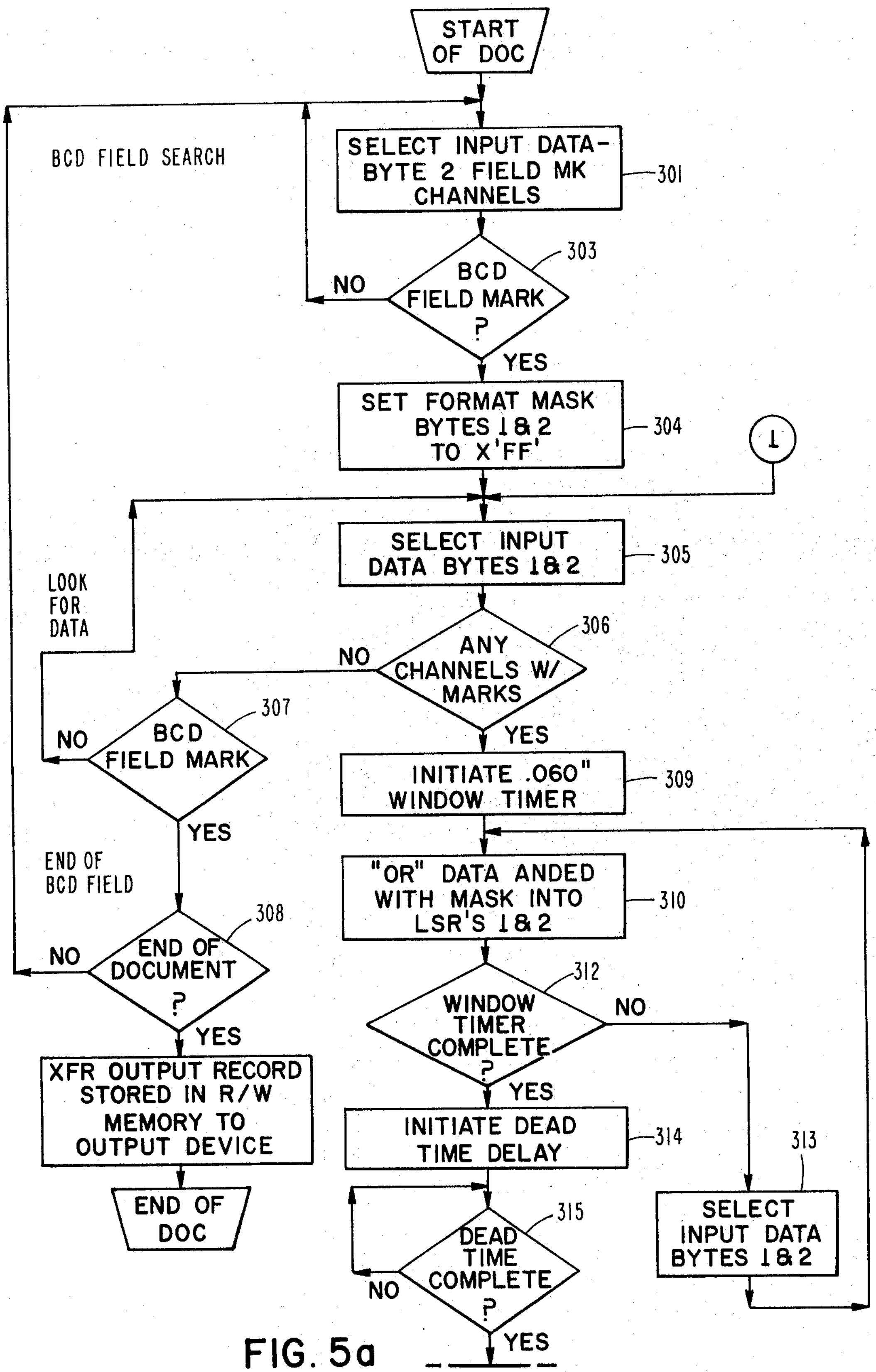
FIGS. 5*a* and 5*b* taken together represent a flow diagram of the routines used in a preferred embodiment of the invention.
Figure 5B:
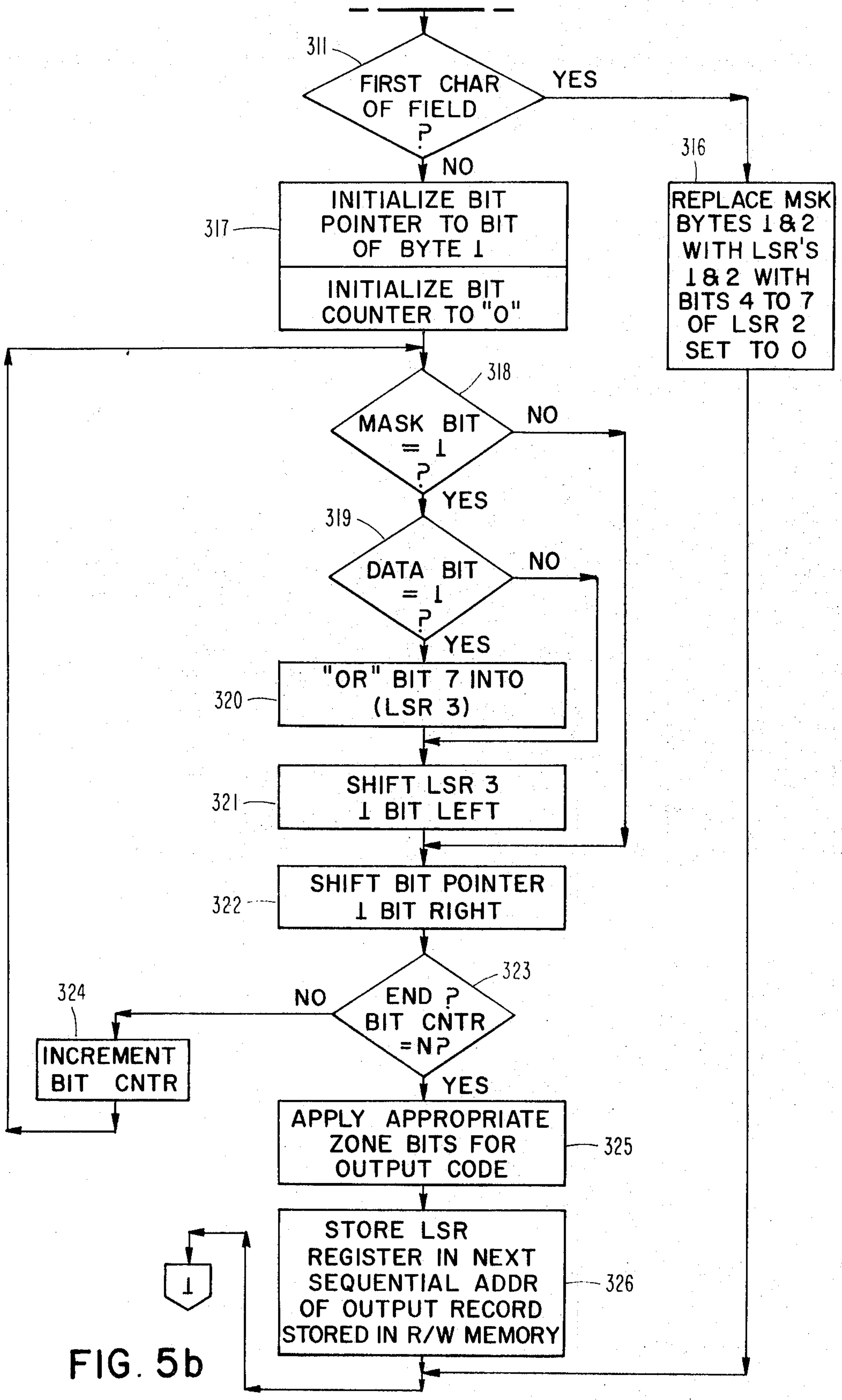

With reference to FIGS. 5*a*, 5*b* and 6, the data signals from read head 20 are applied to gates 200, FIG. 6. However, only the gates related to byte 2 are conditioned at this time by a signal from control 201. In this manner, the microprogram processor selects byte 2 and this step is represented by block 301 in FIG. 5a. The byte is transferred to the D register 202 and bits in positions 6 and 7 of byte 2 are tested by the branch-on condition testing circuit 203 to determine if a field mark has been sensed. This test is represented by decision block 303 in FIG. 5*a*. If a field mark has not been detected, the Field Mark Detection microprogrammed processor routine continues to loop upon itself as represented in FIG. 5*a* until a field mark is detected.

The byte 2 containing the bits representing the field mark is transferred to one of the LSR registers 204 and the microprogrammed processor switches into a Look For Data routine. For this routine, both bytes 1 and 2 are selected. This is because a mark could be sensed by any one of the channels 1–12 of read head 20. The Look For Data routine starts a Window Timer routine upon detecting the first data bit in either bytes 1 or 2. Detection of the first data bit in bytes 1 and 2 is accomplished by the BOC testing circuit 203. The various Branch-On Condition tests are shown in a table in FIG. 9. The Branch-On Condition instruction, as well as the other instructions for the microprogram processor, as shown in FIG. 8.

The particular sequence of instructions forming the Look For Data routine are contained in the read only storage microprogram unit 205. The Look for Data routine selects bytes 1 and 2 sequentially and transfers these bytes via the register 202 into LSR registers 204. Logical instructions select the bytes from the LSR registers 204 and transfers the bytes to the arithmetic and logic unit 207 via gating 208. The output of the ALU 207 is applied to the D register 202 and the byte in the D register is then tested by Branch-On Condition testing circuit 203 to see if all bits are zero. Byte 2 is checked with a mask to eliminate bits from positions 4–7 inclusive and thus only bits in positions 0–3 are tested for the zero condition. Any bit condition other than zero in either bytes 1 or 2 switches the operation to the Window Timer routine. During the Window Timer routine, two bytes are sequentially selected successively. The data from the successive bytes are ORed and Anded with the mask bytes into LSR' s 1 and 2 of LSR's 204. This action continues until the Window Timer is complete. Completion of the Window Timer routine initiates the Dead Time routine. The dead time routine performs the same function as previously described, i.e., to separate the rows of marks on the document and particularly to eliminate the effects of sensing shadow printing. At the end of the Dead Time routine, the operation branches back to the routine previously identified as Looking For Data.

As seen in FIG. 5*a*, this operation is also represented as including block 304 where th format mask bytes 1 and 2 in storage 209 of FIG. 6 are set to hepidecimal 'FF'. Block 305 selects bytes 1 and 2 as input data and block 306 tests to see if any of the bit positions in bytes 1 and 2, excluding bit positions 4–7 of byte 2, contain bits. Block 307 tests to see if byte 2 contains bits representing the BCD field mark. The no result shifts the operation back to block 305. The yes result takes the operation to decision block 308 which tests to determine if the operation has reached the end of the document. If the result is no, the operation loops back to block 301. If the answer from block 306 is yes, the Window Timer routine is initiated as represented by block 309. During the window timer routine, successive sets of bytes 1 and 2 are obtained as a row of marks are scanned. The bits from successive bytes 1 and 2 are Ored and Anded with the mask bits into LSR's 1 and 2. This action is represented by block 310. Block 312 tests to determine if the window timer routine is complete. If the result is no, block 313 continues to select bytes 1 and 2, i.e., producing the successive sets of bytes 1 and 2. Completion of the Window Timer routine initiates the Dead Time delay as represented by block 314. Block 315 tests to see if the dead time delay routine is complete.

The yes condition from block 315 leads to decision block 311 of a Translate routine in FIG. 5*b*. Block 311 tests to determine if the row just scanned is the first character of the field, i.e., the format character. If the result is yes, then block 316 causes the mask bytes 1 and 2 to be replaced with the bytes in LSR's 1 and 2, however, with bits 4–7 of LSR 2 set to zero. The operation then switches to block 305 of FIG. 5a.

The look For Data routine would again be initiated and in sequence the Window Timer routine and Dead Time routine would follow. However, the result of the test made by block 311 would be no and this would take the operation to block 317. The operation represented by block 317 is in the Translate routine. During this routine, the bits of bytes 1 and 2 and LSR's 1 and 3, are shifted one bit at a time and compared with corresponding bits of the format bytes 1 and 2 in storage 209. This is accomplished by transferring the format bytes from storage 209 to LSR'204.

A bit pointer as determined by an instruction from the microprogram in 205 is initialized so as to point to bit zero of byte 1. A bit counter which is a combination of an LSR controlled by instructions in microprogram 205 is initialized to 0. The program then tests the corresponding mask bit to see if it is a 1. This test is made by BOC testing 203 and the test is represented by decision block 318. If the mask bit is a 1, then a test is made to see if the corresponding data bit is a 1. This test is similarly performed by branch-on condition testing 203 and the test is represented by the decision block 319 in FIG. 5b. If the data bit is a 1, then the bit is placed into bit position 7 of an LSR 204. This is represented by block 320. This LSR Is then shifted left one bit as represented by block 321. The bit pointer is then shifted one bit to the right to point to bit position 1 of byte 1. This operation is represented by block 322. A test is then made to determine whether the bit counter has reached the value N or as in this example, twelve. If it has not, then the bit counter is incremented and the operation returns to decision block 318.

The tests for determining whether or not the bit counter has reached the value N, is represented by decision block 323. The operation for incrementing the bit counter is represented by block 324. The operation continues in a manner just described until the bit counter reaches the value N. When this occurs, the output byte representing the BCD character will be completely contained in the LSR. The operation then switches to a Data Transfer routine where the BCD character in the LSR is transferred to storage 209. In this particular example, the BCD character is converted to an EBCDIC character by applying appropriate zone bits to form a eight bit byte. The parity bit is only used for checking. The operation for applying the appropriate zone bits is represented by block 325 in FIG. 5*b*. After a record has been completely stored, it is transferred via register 210 to a utilization device which could be a computer or other suitable device such as a magnetic tape unit, etc.

The particular routines which have been described, each include a sequence of instructions of the type shown in FIG. 8. There are several types of transfer instructions and a table of transfer instructions used in the microprogrammed processor is shown in FIG. 10. Although specific sequences of instructions have not been shown, they have been described in sufficient detail to enable any one skilled in the art to construct the necessary sequence of instructions. The following description of the instructions used in the microprogrammed processor explains the instruction operations in detail.

With reference to FIG. 8, the Store LSR instruction has an OP code of 0. Field 1 contains bits 3-7 for the address of the LSR (0–31) into which the contents of field 2 is stored. Field 2 contains the contents to be stored in the LSR location designated by field 1. The D register 202 is set to the constant in field 2 and the A register 211 is set to 0 at the start of the instruction. Upon execution, the Store LSR instruction selects the LSR as defined and places the field 2 data in the D register 202 and the contents thereof is then placed in the LSR selected.

The Branch Unconditionally instruction has an OP code of 3. Field 1 contains the four high order bits of a twelve bit address for ROS micrograms 205. These bits define which page in ROS 205 will be addressed. A page is a group of 256 ROS addresses. The pages are in incremental groups of 0–255, 256–511, etc. Field 2 contains the eight low order bits of a twelve bit address for ROS microprogram 205. These bits define the address within the page described by field 1. The Branch Unconditionally micro instruction upon execution causes the ROS address register 212 to be set to the contents of fields 1 and 2.

The Branch-on Condition instruction has an OP code of 1. Field 1 contains the encoded form of 32 conditions which, when met, cause a branch to the address in field 2. When the branch condition is not met, the next sequential instruction is executed. Field 2 contains the address within the page in which the BOC occurs, that the ROS address register 212 is set to if the condition in field 1 is met. The Branch-On Condition micro instruction logically compares the information specified by field 1 and the actual machine conditon with hardware circuits to determine conditon met or not met.

The Transfer instruction has an OP code of 2. Bits 3–7 of field 1 define which of the 32 LSR's are involved in the operation. Bits 8–15 of field 2 contain 1 of 28 registers which are used in the transfer operation. The transfer instruction transfers information into or out of the selected LSR from one of the 28 registers defined in field 2.

The instructions Logical And and LOGICAL AND M have OP codes of C and D respectively. The Logical And instruction modifies the contents of the selected LSR by storing the generated information from the D register into the LSR. The Logical And M instruction does not modify the contents of the selected LSR. The A register 211 is set to 0 and the end of the logical operation. The micro instructions place the contents of the selected LSR onto bus 213. The contents of field 2 is ORed with the contents of register 211. The results is then ANDed with the contents on the bus 213 and the output from ALU 207 is placed in register 202.

The logical instructions OR I and OR M have OP codes 8 and 9 respectively. The instruction OR I modifies the contents of the selected LSR by storing the generated information on bus 214 in the LSR. The instruction OR M does not modify the contents of the LSR. Register 211 is set to 0 following the exectuion of either instruction. Field 1 of the instruction contains the address of the LSR byte which is placed on bus 213. Field 2 contains the constant that is ORed with the contents of register 211. When the instructions are executed, the contents of the selected LSR is placed on bus 213. The contents of field 2 is ORed with the contents of register 211. The ALU 207 output is placed in the D ergister 202.

The logical Exclusive XO and Exclusive XOM instructions have OP codes E and F respectively. The OP code E modifies the contents of the selected LSR by storing the generated bus 213 information in the LSR. The OP code F does not modify the contents of the LSR. The register 211 is set to 0 following the execution of either instruction. Field 1 contains the address of the LSR byte which is placed onto bus 213. Field 2 contains the constant that is ORed with the contents of register 211. When the instructions are executed, the information of the selected LSR is placed on bus 213. The information in field 2 is ORed with the contents of register 211 and is placed on a bus. The bus information from 213 and from the A register 211 is Exclusive ORed in the ALU 207. The output of ALU 207 is placed in register 202.

The Arithmetic Add and Arithmetic Add M instructions have OP codes A and B respectively. The OP code A modified the contents of the selected LSR by storing the generated bus 214 information in the LSR. The OP code B does not modify the contents of the selected LSR. Register 211 is set to 0 following the execution of either OP code. Field 1 contains the address of the LSR byte which is placed on bus 213. Field 2 contains the constant that is ORed with the data in register 211. These micro instructions place the information from the selected LSR on bus 213. The information in field 2 is ORed with the contents of register 211 and is placed onto a bus. The data on the buses are ANDed in the ALU 207 and the output of ALU 207 is placed into register 202.

From the foregoing, it is seen that the invention provides a method and apparatus for reading documents bearing coded data in the form of sensible indicia where the data type is defined by the particular type of field mark. In this particular example, the field defining mark 11 upon being decoded, indicates that the field of data is a BCD field. Further, the BCD field is self-clocking and no timing marks are used to locate particular rows of marks. The format for the particular BCD field is identified by a format character which is the first character read in the field. The format character indicates which M of N data indicia is to be selected as each row of marks are sensed. A closing field defining mark 11b indicates the end of the BCD field. Other mark read data is defined by data type mark 12 which also serves as a timing mark for reading associated rows of mark read data. It is seen that the invention is particularly useful in that it accommodates mark read documents having different formats.

What is claimed is:

1. Apparatus for reading coded data on information bearing media comprising first sensing means for generating a control signal in response to sensing field identifying indicia, second sending means for generating signals in response to sensing successively M format and N data indicia, control means responsive to said control signal for generating a first signal indicating the sensing of format indicia and a second signal indicating the sensing of data indicia by said second sensing means, and means responsive to M sensed format indicia as indicated by said first signal for selecting M of N sensed data indicia as indicated by said second signal.

2. Apparatus for reading coded data on information bearing media comprising sensing means having a plurality of channels including channels for sensing field defining indicia and channels for sensing data indicia, data type defining means responsive to signals from said field defining indicia channels for indicating detection of a particular type of fielded defining indicia, control means responsive to an indication by said data type defining means having detected a particular type of field defining indicia for generating a first control signal for indicating that the indicia being sensed by said data channels is a format character and for generating second control signals in response to said data channels sensing data indicia, means responsive to said first and second control signals for storing the signal from said data channels as a format character, means for generating selection signals for each signal from said storage means forming said format character, and means responsive to said second control signal for storing data signals from only those data channels selected by said selection signals.

3. The apparatus for reading coded data on information bearing media is in claim 2 wherein said data type defining means is a logical AND circuit.

4. The apparatus for reading coded data on information bearing media as in claim 2 wherein the first of said second control signal is used to terminate said first control signal.

5. The apparatus for reading coded data on information bearing media as in claim 2 wherein said means for generating selection signals comprises a clock for generating a plurality of phase pulses, a counter advanced by one of said phase pulses from said clock, and a plurality of logical AND circuits connected to receive signals from said counter and said format signals from storage.

6. The apparatus for reading coded data on information bearing media as in claim 2 wherein said means for storing signals from only those data channels selected by said selection signals is a shift register.

7. The apparatus for reading coded data on information bearing media as in claim 2 further comprising means for transferring data from said means for storing signals from only those data channels selected by said selection signal under control of one of said second control signals.

8. Apparatus for reading coded data on information bearing media comprising sensing means having a plurality of channels including channels for sensing field defining indicia and channels for sensing data indicia, and a micro programmed processor including means for selecting signals generated by said sensing means to determine if said sensing means has sensed field defining indicia of a particular type, means responsive to the sensing of the field defining indicia of a particular type for testing to determined if any of the data channels of said sensing means has sensed any data indicia, means for initiating a window timer sequence of signals in resoonse to sensing data indicia, means for storing signals from said data channels during said window timer routine, means for indicating completion of said window timer routine, means responsive to completion of said window timer routine for indicating that the first character sensed by said data channels is a first character, second data storage means, means for transferring said stored data upon completion of sensing a first character to said second stroage means, third storage means, and means for entering bits of a second character sensed by said data channels under control of said first character.

9. Apparatus for reading coded data on information bearing media comprising sensing means having a plurality of channels including channels for sensing field defining indicia and channels for sensing data indicia, and a micro programmed processor coupled to said sensing means and having an assembled instruction sequence for performing a field mark detection routine to identify data field types, said field mark detection routine after identifying a field mark initiating a look for data routine to detect data sensed by said data channels to initiate a window timer routine for controlling collection of data sensed by said data channels, and a data translate routine having one branch for indicating that the data indicia sensed by said data channels and collected during said window timer routine is a first character and another branch for selecting data bits of a data character collected during said window transfer routine under control of bits of said first character, completion of said translate routine initiating said look for data routine.

10. The apparatus of claim 9 further comprising a data transfer routine which is initiated upon each completion of said another branch of said translate routine for transferring the selected bits of a data character to form an assembled record of data characters.

11. A method of sensing coded indicia on information bearing media comprising, sensing data field identifying indicia and generating control signals indicating that said data field identifying indicia has been sensed, sensing format indicia within said data field said format indicia defining which M of N data indicia is to be selected, sensing N data indicia, and selecting M data indicia of said sensed N data indicia defined by said format indicia.

12. A method for sensing coded indicia on information bearing media comprising the steps of sensing field identifying indicia, successively sensing data indicia, selecting the first sensed data indicia as format indicia indicating which M of N data indicia positions are to be selected, and selecting M data indicia of said sensed N data indicia of said sensed N data indicia after sensing said first sensed N data indicia under control of said format indicia.

13. A record medium comprising first sensible indicia located thereon to define data fields and to define the type of data within the associated fields, second sensible indicia located within said fields defined by said first sensible indicia to define which M of N data positions are to be sensed, and third sensible indicia located in said data fields in said M positions defined by said second indicia to represent data according to a predetermined code.

14. The record medium as in claim 13 wherein said second and thord indicia are located in relationship to said first indicia so that said first indicia is a reference to facilitate sensing said second and third indicia.

* * * * *

PO-1050
(5/69)

UNITED STATES PATENT OFFICE
CERTIFICATE OF CORRECTION

Patent No. 3,763,467 Dated October 2, 1973

Inventor(s) Kenneth W. Cash et al

It is certified that error appears in the above-identified patent and that said Letters Patent are hereby corrected as shown below:

Column 11, line 12, delete "sending" and insert --sensing--.

Column 11, line 30, delete "fielded" and insert --field--.

Column 12, line 21, delete "resoonse" and insert --response--.

Column 14, line 15, delete "thord" and insert --third--.

Signed and sealed this 2nd day of April 1974.

(SEAL)
Attest:

EDWARD M.FLETCHER,JR.
Attesting Officer

C. MARSHALL DANN
Commissioner of Patents

199